US006923433B2

(12) United States Patent
Gross et al.

(10) Patent No.: US 6,923,433 B2
(45) Date of Patent: Aug. 2, 2005

(54) PNEUMATIC SPRING WITH INTEGRATED CONTROL VALVE

(75) Inventors: Alexander Gross, Bischofsheim (DE); Christophe Jolibert, Champs sur Marne Frankreich (FR)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/338,579

(22) Filed: Jan. 8, 2003

(65) Prior Publication Data

US 2003/0137086 A1 Jul. 24, 2003

(30) Foreign Application Priority Data

Jan. 9, 2002 (DE) ........................................ 102 00 553

(51) Int. Cl.[7] .......................... F16F 9/084; F16F 9/512; B60G 11/27; B60G 17/04

(52) U.S. Cl. ................................ 267/64.11; 267/64.21; 267/122

(58) Field of Search ...................... 280/DIG. 1, 124.16, 280/5.515, 124.157–124.163; 267/DIG. 1, 122, 64.11–64.28, 221; 188/266.1, 266.3, 266.4

(56) References Cited

U.S. PATENT DOCUMENTS

| | | | | |
|---|---|---|---|---|
| 3,000,624 A | | 9/1961 | Cislo | 267/65 |
| 3,372,919 A | | 3/1968 | Jackson | 267/65 |
| RE33,696 E | * | 9/1991 | Stevenson | 267/33 |
| 5,649,692 A | | 7/1997 | Gilsdorf et al. | 267/64.21 |
| 6,332,624 B1 | | 12/2001 | Gilsdorf et al. | 280/124.16 |
| 2003/0137086 A1 | * | 7/2003 | Gross et al. | 267/64.11 |

FOREIGN PATENT DOCUMENTS

| | | | |
|---|---|---|---|
| DE | 1056488 | 10/1959 | |
| DE | 44 06 607 | 9/1995 | F16F/9/05 |
| DE | 010200553 C1 * | 7/2003 | |
| EP | 001327538 A2 * | 7/2003 | |

OTHER PUBLICATIONS

Translation of submitted German Search Report.*
Translation of submitted German 1056488.*

* cited by examiner

*Primary Examiner*—Douglas C. Butler
(74) *Attorney, Agent, or Firm*—Cohen, Pontani, Lieberman & Pavane

(57) ABSTRACT

Pneumatic spring with at least one control valve inside the pneumatic spring with control positions for feeding, blocking, and discharging compressed air, which valve is actuated by a control element also installed inside the pneumatic valve. The control element acts on one of the two pneumatic spring assemblies which can move relative to each other, namely, either on the outer tube or on the roll tube, where the control element has a working length which is shorter than the stroke length of the pneumatic spring and is pretensioned by a first spring against one of the pneumatic spring assemblies which can move relative to each other. The control element is supported in a floating manner relative to the pneumatic spring assemblies, and a second spring, the force of which is directed against the first spring, co-determines the position of the control element.

14 Claims, 6 Drawing Sheets

PNEUMATIC SPRING WITH INTEGRATED CONTROL VALVE

BACKGROUND OF THE INVENTION

1. Field of the Invention

The invention pertains to a pneumatic spring with a rolling bellows arranged between an outer tube and a roll rube, and at least one control valve with positions for feeding, blocking, and discharging compressed air. The control valve is actuated by a control element which acts on either the outer tube or the roll tube, and which has a working length which is shorter than the stroke of the pneumatic spring. The control element is supported in a floating manner relative to the outer tube and the roll tube, and is loaded by a first spring against one of the outer tube and the roll.

2. Description of the Related Art

U.S. Pat. No. 6,332,624 discloses a pneumatic spring with an integrated control valve, this control valve being actuated by a control element, the working length of which is shorter than the length of the stroke of the pneumatic spring. For this purpose, the control element is supported so that it floats in the axial direction and is pretensioned by a spring element so that the control element follows the stroke of the outer tube until a stop limits the further control movement of the control element, at which point the outer tube breaks the working connection with the control element.

Depending on the speed at which the control element travels outward, an audible sound, which can create a disturbing impression, is produced when the stop for the control element makes contact with the roll tube or with a component connected to this assembly. A similar effect can occur when the pneumatic spring returns to the desired level position from a point further outward and the outer tube re-establishes its working connection with the control element.

This problem does not occur in the case of the basic design according to U.S. Pat. No. 5,649,692, because the control element is permanently connected to the roll tube, which means that there cannot be any relative motion between these two components which could cause noise.

SUMMARY OF THE INVENTION

The task of the present invention is to minimize the noise problems known according to the state of the art which are associated with pneumatic springs.

This task is accomplished according to the invention in that a second spring, the force of which is directed against that of the first spring, co-determines the position of the control element.

The great advantage of the invention is that the control element is held by the elastic forces of the two springs in its extreme positions without the need for a stationary stop. By the principle of their design, the springs suppress all noise, so that a person standing outside the device cannot hear when the springs hold the control element in a state of equilibrium.

As a further design measure, the second spring is supported on the outer tube assembly. In this variant, there is permanent contact between the roll tube assembly and the control element, which means that, for this reason as well, it is impossible for any contact noise to occur.

For this purpose it is effective for the second spring to have greater elastic force than the first spring—at least after the pneumatic spring reaches a defined level position in the inward-travel direction. It is sufficient for the second spring to have the same force as the first spring from the maximum outward position to the level position. Although there is an elastic connection between the roll tube assembly and the control element, the greater stiffness of the second spring guarantees that changes in the stroke of the pneumatic spring will be transmitted without error to the control element.

Thus the second spring can be made of elastomeric material.

As an alternative, it is also possible to use a helical spring, where in this case it is advantageous for the control element to be equipped with a plate spring for the second spring.

In this variant, it is possible to use a very short control element, because the control element can be allowed to arrive at an end position quickly when, for example, the outer tube travels inward. At the same time, the second spring still allows further relative movement of the outer tube assembly toward the control element, because the second spring is able to compensate for this travel. With respect to the function of the control valve, it does not matter whether the pneumatic spring has traveled a short or a long distance inward or outward from a predetermined level position. Compressed air is supplied or discharged independently of the absolute distance traveled.

To avoid the noise caused by a stop when the control element reaches an end position relative to the roll tube assembly, an elastic stop is installed functionally between the control element and the roll tube assembly.

In an alternative variant, a tension retaining means determines an end position of the control element against the elastic force of the first spring.

It is advantageous for the tension retaining means to be designed as a second spring in the form of a tension spring, which acts on the roll tube assembly.

A stop damping element is also installed functionally between a contact surface of the roll tube assembly and a contact surface of the control element.

To arrive at the simplest possible sequence of assembly steps, the control element has an axial stop, which determines the final installation position of the control element. In this connection, the spring rate and the spring travel of the second spring are calculated in such a way that, in the final installation state of the pneumatic spring, the axial stop remains disengaged regardless of the stroke position at the moment in question.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
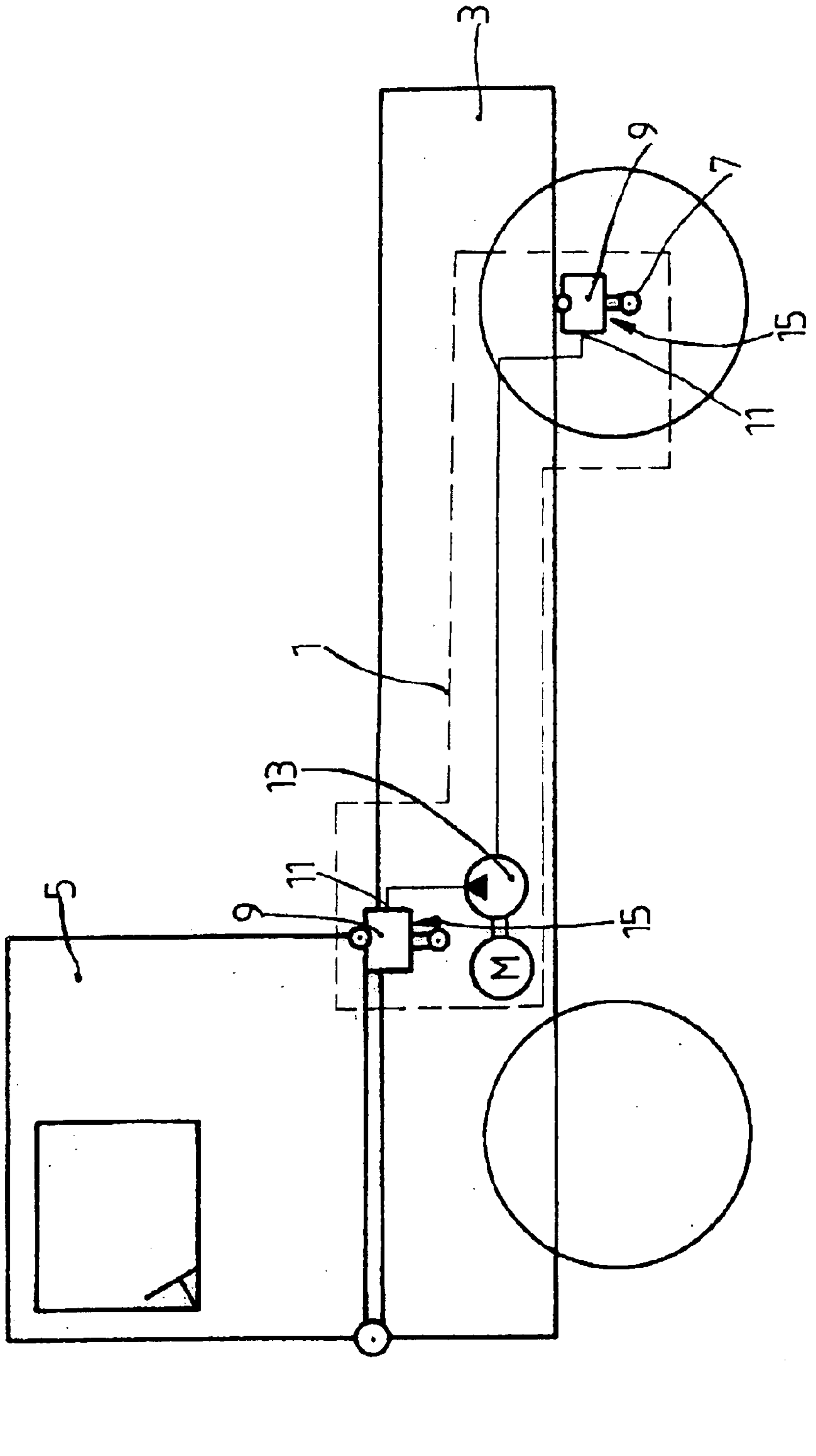
FIG. 1 shows an example of an application of the invention.

FIG. 1 shows the installation of a pneumatic spring system 1 between a chassis 3 and a vehicle component supported in a floating manner relative to the chassis 3, such as a cab 5 or a vehicle axle 7. At least one pneumatic spring 9 is connected by a supply connection 11 to a source 13 of compressed air. A control valve 15 is provided as part of the pneumatic spring 9. The air is supplied by a compressor unit.

Figure 2:
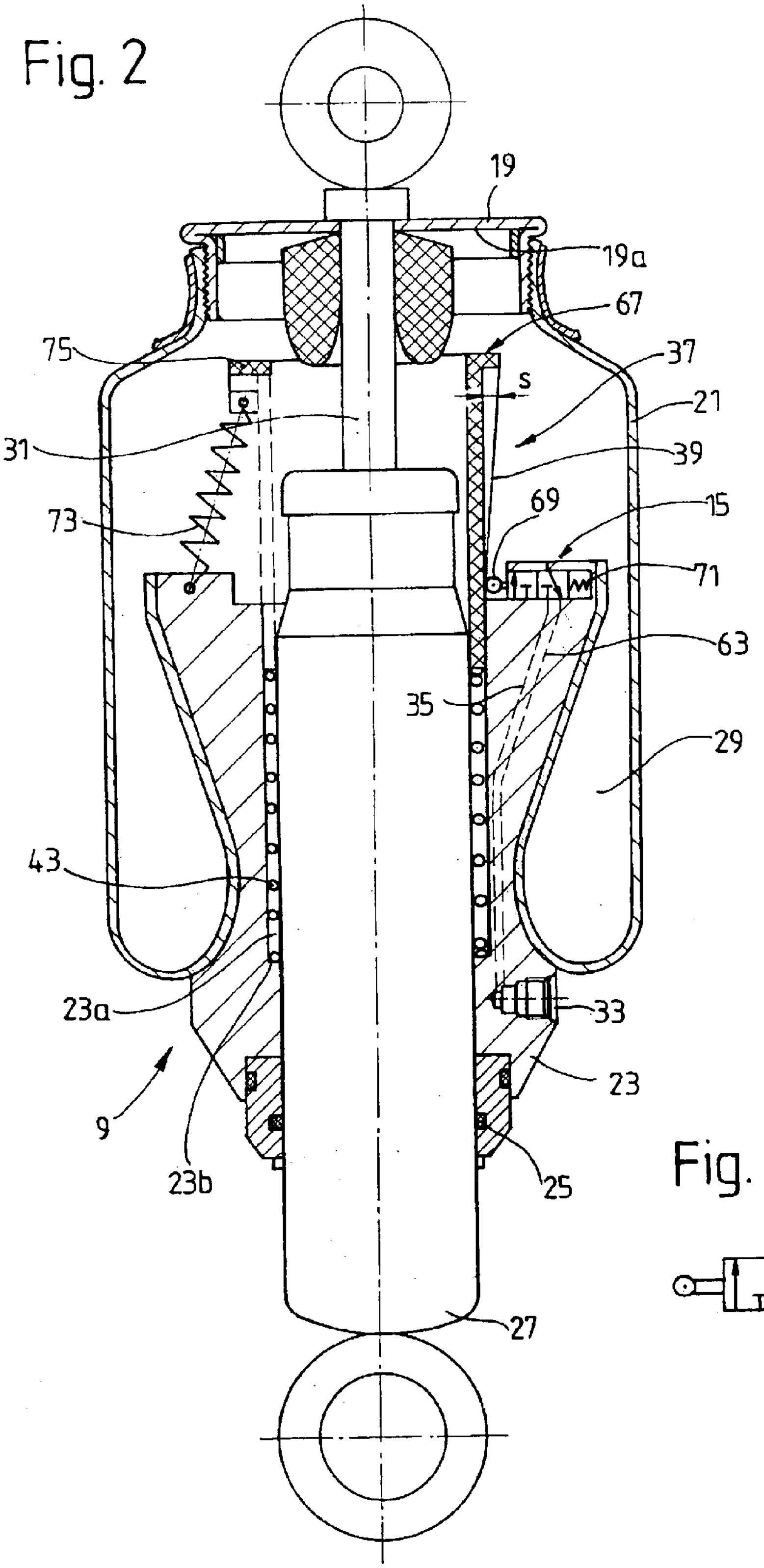
FIG. 2 shows a first design variant.

The view of FIG. 2 is limited to the pneumatic spring 9. This pneumatic spring 9 has an outer tube 19, to which one end of a spring bellows 21 is attached, whereas the other end of the spring bellows 21 is clamped to a roll tube 23. The roll tube 23 is sealed off from the jacket tube 27 by gaskets 25. A pressurized spring space 29 is bounded by the spring bellows 21 and the outer tube 19.

A piston rod 31, which, together with the jacket tube 27, is a component of a vibration damper, is in working connection with the outer tube 19. The pneumatic spring 9 thus consists of two pneumatic spring assemblies, which are free to move with respect to each other. A first pneumatic spring assembly comprises the outer tube with the piston rod and possibly the components connected to it such as a stop buffer. The roll tube 23, the container tube 27, and any parts attached to these components belong to the second pneumatic spring assembly.

Inside the roll tube 23, a supply connection 33 is provided, which continues in the form of a compressed air feed line 35 for the control valve 15. The compressed air feed line 35 leads to the spring space 29. The control valve 15, which adjusts the compressed air feed, is installed at the outlet of the compressed air feed line 35 to the spring space 29.

Figure 3:
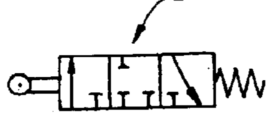
FIG. 3 shows an alternative control valve.

The control valve 15 is illustrated in the form of a circuit diagram as a 3/2-port directional control valve by way of example. It would certainly also be possible to imagine a control valve with a position in which the discharge line 63 and the compressed air feed line 35 are blocked simultaneously, this position being assumed whenever the pneumatic spring is in the normal range of its stroke positions. As FIG. 3 shows, it is also a reasonable alternative to use a 3/3-port directional control valve.

Inside an annular space 23*a* in the roll tube 23, a control element 37 is provided, which actuates a transmission element 69, which in turn determines the various switch positions of the control valve 15. The control element 37 can be in the form of a rod or, as indicated in broken line, in the form of a sleeve, and it is supported so that it floats in the longitudinal direction with respect to the roll tube 23, where it is supported on a first spring element 43, which in turn rests against a support surface 23*b* of the roll tube. In addition, a second spring 73 in the form of a tension spring acts as a tension retaining means on the control element 37, the other end of this tension spring being attached to the roll tube or to a stationary component of this assembly. At the instant shown in the figure, the pneumatic spring 9 is in a stroke position which is greater than a defined level position. There is a gap between the contact surface 67 of the control element and a contact surface 19*a* of the outer tube assembly 19. The contact surface 67 of the control element is formed by a stop damper element 75. The gap is determined by the forces of the two opposing springs 43, 73, where the force of the first spring 43, starting from the maximum inward travel position until the level position is reached, is greater than the force of the second spring 73 or of some other tension retaining means such as a cable.

When the pneumatic spring travels inward, the contact surface 19*a* of the outer tube comes to rest against the stop damper element 75 of the control element 37. As a result, there cannot be any noise problems in association with the control element 37 when the pneumatic spring occupies a stroke position outside the level position.

A guide way 39 in the form of a ramp is provided on the control element. When the stroke length of the control element 37 changes against the forces of the first and second springs 43, 73, the radial actuating distance "s" relative to the control valve 15 also changes, this process proceeding from the guide way via the transmission element 69. A restoring spring 71 ensures that the transmission element 69 always remains in contact with the guide way 39 and that it can thus always exert an actuating force on the control valve 15 even when the piston rod 31 of the pneumatic spring moves outward.

If the control element 37 is designed as a cone in the area of the guide way 39, then the adjusting distance "s" for the transmission element 69 is independent of any rotational movement which the control element 37 might experience as a result of vibration. In a design of this type, there is no need to take any measures to ensure that the control element 37 is installed properly in terms of its alignment in the circumferential direction so that it can thus cooperate as intended with the control valve 15.

Figure 4:
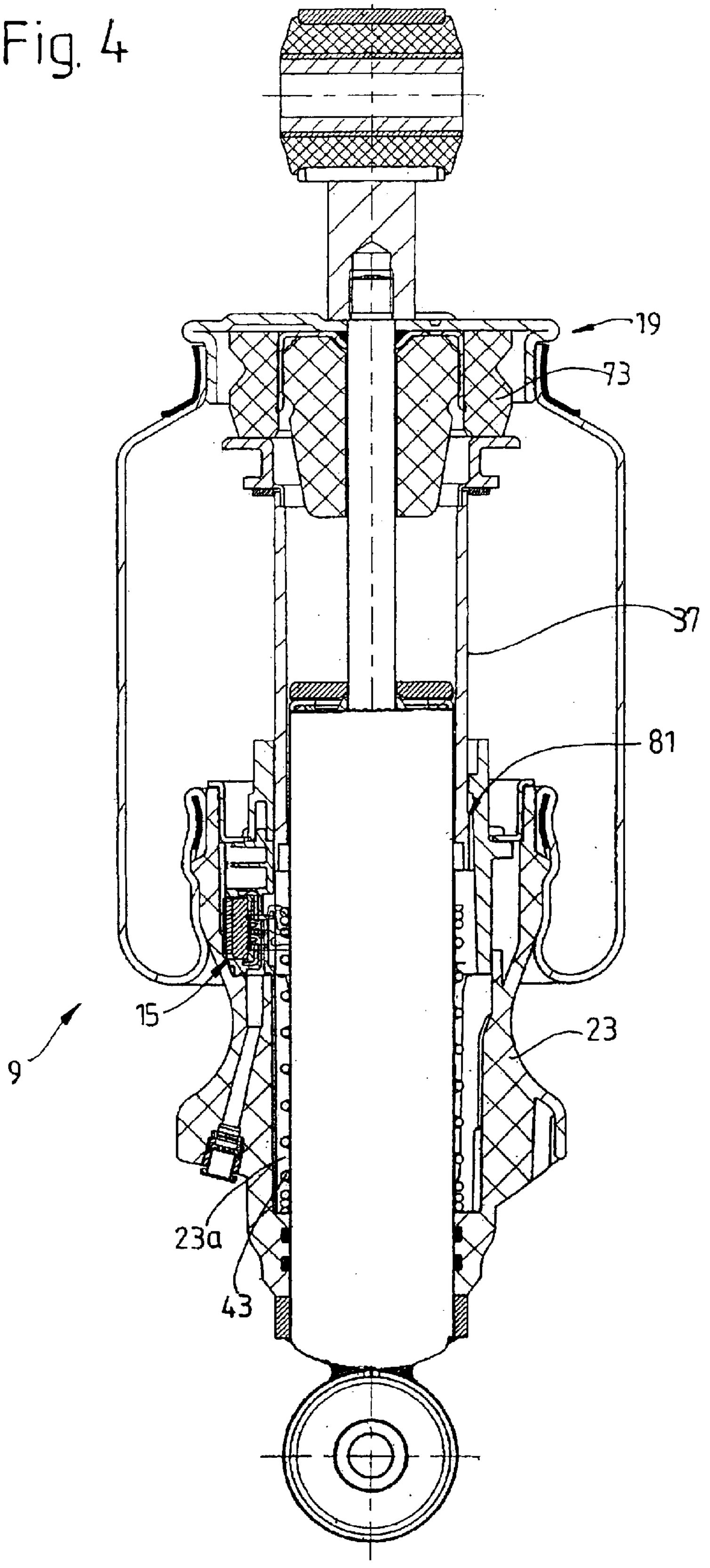
FIGS. 4, 5 and 6 are cross-sectional views showing a second design variant in various stages of extension.
Figure 5:
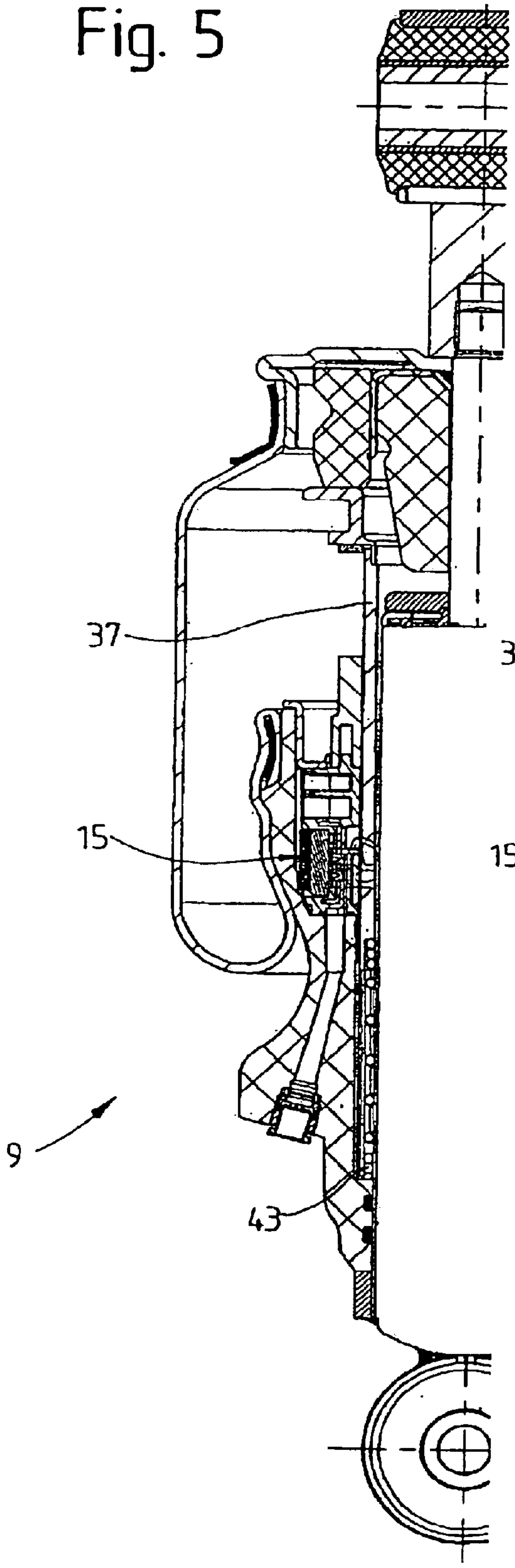
Figure 5A:
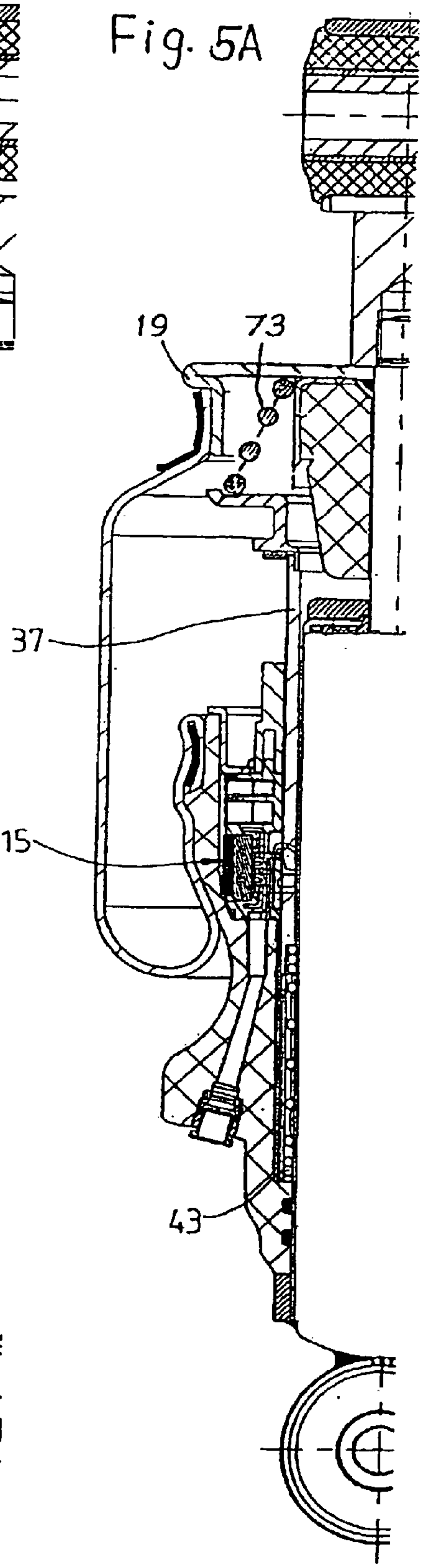
FIG. 5A shows an alternative spring in the variant of FIGS. 4, 5 and 6.
Figure 6:
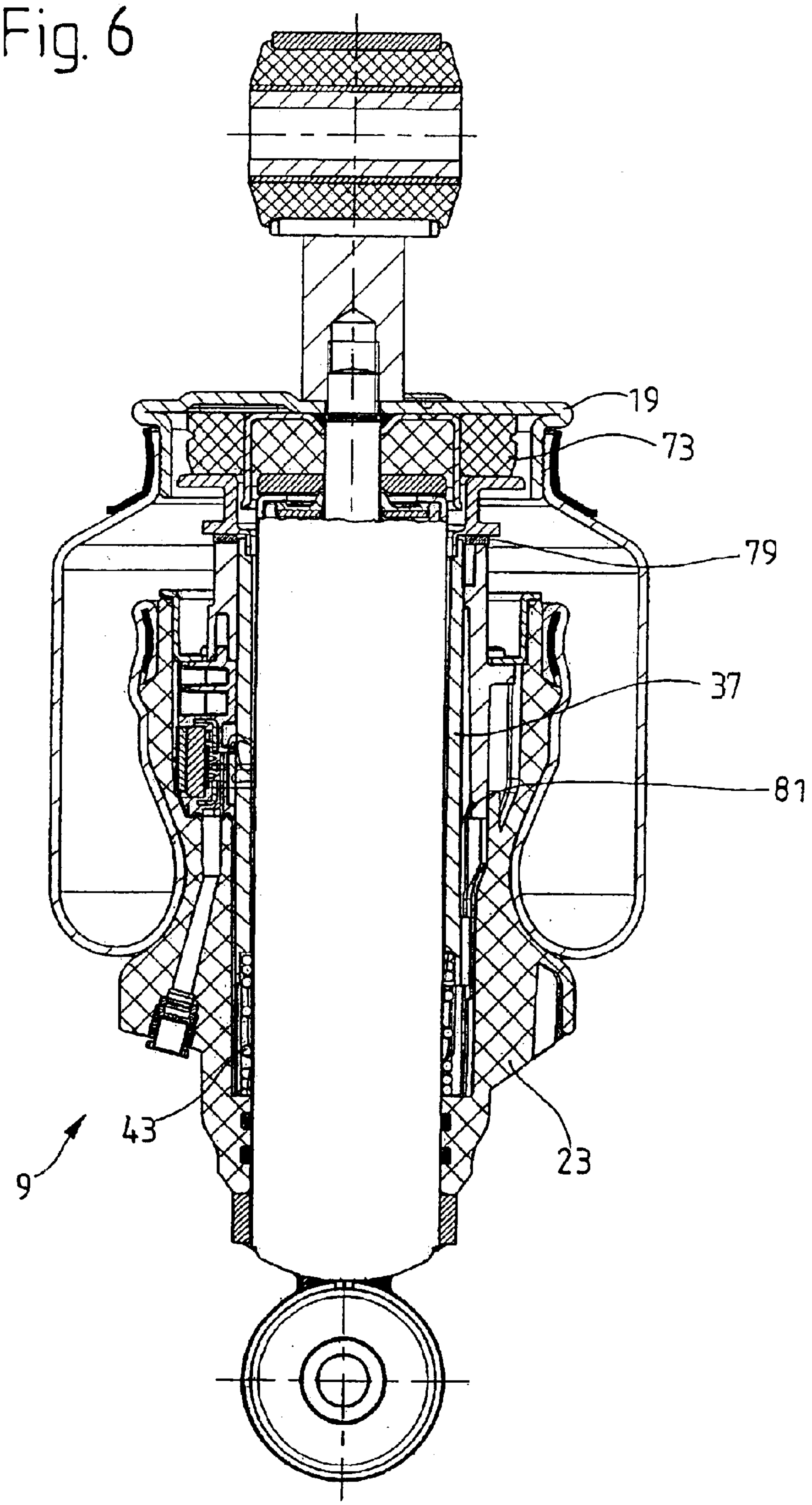
Figure 7:
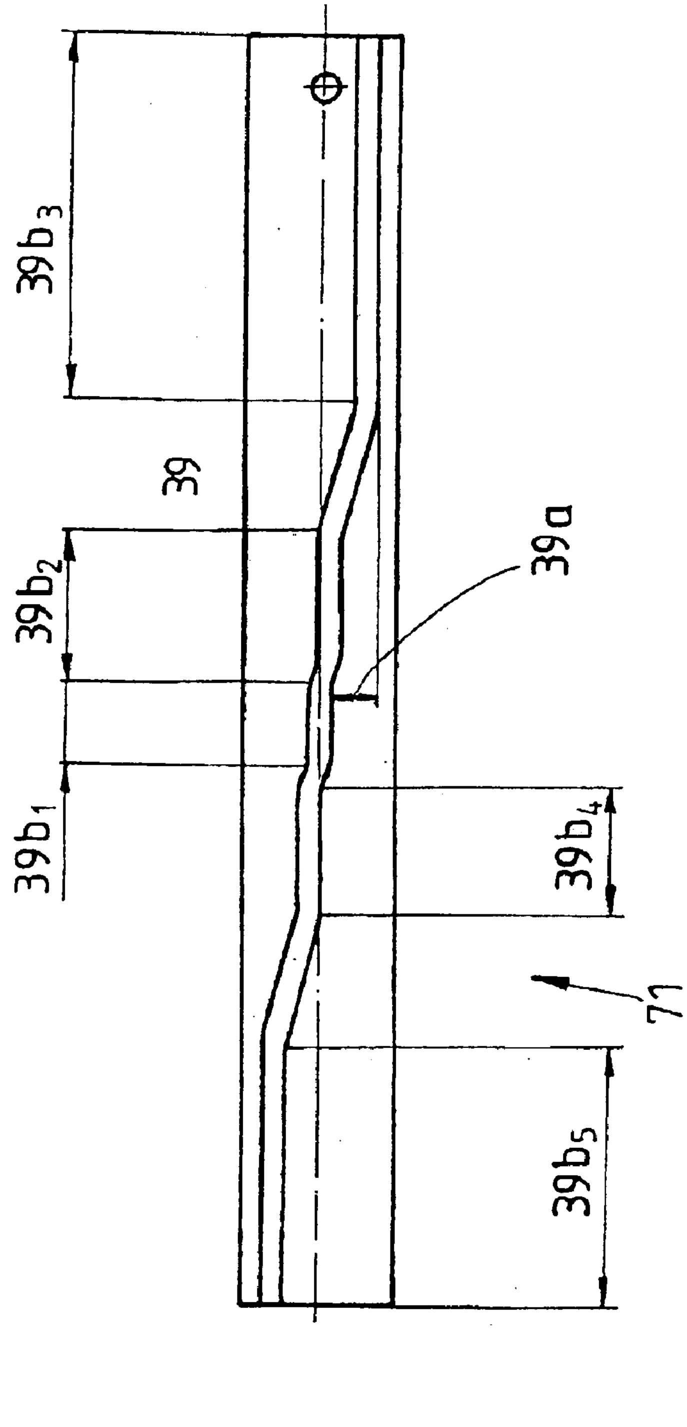
FIG. 7 is a plan view of the guideway controlling the rotary slide valve of FIGS. 4, 5 and 6.

FIGS. 4–6 show an alternative to FIG. 2 with the pneumatic spring 9 in various stroke positions. The essential aspects of the design are the same as those of FIG. 2. One difference, however, is that the control valve 15 is designed as a rotary slide valve, which is actuated by a control element 37. The control element has a guide way 39, which, starting from a reference point (FIG. 7) on the guide way 39, is offset in the circumferential direction. This guide way 39 works together with a rotary slide valve body, where a radial offset 39*a* of the guide way 39 leads, via the engagement of the rotary slide valve body with the guide way, to a rotational movement when the guide way executes relative translational movement starting from the reference position. Reference can be made to U.S. Pat. No. 6,332,624 with respect to a possible design of the rotary slide valve.

Another difference with respect to the solution according to FIG. 2 is that the control element 37 is always in contact with the outer tube assembly 19, regardless of the level position which the pneumatic spring might be occupying at the moment in question. For this purpose, the second spring 73 is supported on the outer tube 19 and this thus is permanently pretensioned by the pneumatic spring regardless of its stroke. It is possible for the second spring to be made of elastomeric material. Without sacrificing performance, however, it is also possible to use a helical spring, in which case the control element would be provided with a spring plate 77 (FIG. 5). The spring force 73 of the second spring is greater than the force of the first spring 43, at least from the point at which the level position in the inward travel direction is reached. As a result, the opposing forces of the springs 43, 73 prevent the control element from occupying an incorrect position with respect to the outer tube. An incorrect position of the control element with respect to the outer tube is to be understood as a situation in which a stroke position of the pneumatic spring is too small to reach the level position results in the movement of the control element relative to the control valve in the direction which would cause air to be supplied.

Proceeding from the maximum outward travel position of the pneumatic spring shown in FIG. 4 and from the desired level position shown in FIG. 5, the control element is shifted by the outer tube 19 in conjunction with the second spring 73 against the force of the first spring 43 toward the roll tube 23. FIG. 6 shows in this connection the maximum inward travel position of the pneumatic spring. When this occurs, the control element occupies an end position, in which an elastic stop 79 installed functionally between the control element 37 and the roll tube assembly 23 is able to act.

As can be seen from an inspection of FIGS. 4–6, the outer tube assembly 19 can execute axial movement relative to the control element 37 after the elastic stop 79 on the roll tube assembly has gone into action, during which only the second spring 73 continues to be pretensioned. For this reason also, the control element can be made very short relative to the stroke length of the pneumatic spring.

As can be seen especially in FIG. 4, the control element has an axial stop 81, which determines a final installation position of the control element 37. During the assembly process, the roll tube is put together with the control valve 15, the first spring 43, and the control element to form the roll tube assembly. The first spring presses the control element 37 positively out of the ring-shaped space 23*a*. So that the unit can be handled during the further course of the assembly process, the axial stop 81 determines a final installation position. In the final installed state, after the second spring 73 has becomes active, the axial stop is disengaged, because the spring rate and the spring travel of the second spring have been selected appropriately with respect to the first spring.

The problems described above with respect to the handling of the roll tube assembly and with respect to the limitation of the stroke of the control element do not necessarily occur in the case of the variant according to FIG. 2, because the first spring 43 and the second spring 73 both act on the roll tube assembly, which means that a final installation position can thus be determined by these two springs 43, 73 alone.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A pneumatic spring assembly comprising an outer tube, a roll tube which is movable through a stroke relative to said outer tube, a rolling bellows arranged between said outer tube and said roll tube and defining therewith a pressurized spring space, a rotary slide control valve fixed with respect to one of said outer tube and said roll tube, a control element which acts on said control valve to feed, block, and discharge compressed air, said control element being supported to float with respect to said outer tube and said roll tube, a first spring which loads said control element toward said outer tube, a second spring which loads said control element toward said roll tube, and an elastic stop which limits travel of the control element with respect to the roll tube.

2. A pneumatic spring assembly as in claim 1 wherein said second spring is supported on said outer tube.

3. A pneumatic spring assembly as in claim 1 wherein said second spring exerts a greater force than said first spring after the pneumatic spring reaches a level position during inward travel.

4. A pneumatic spring assembly as in claim 1 wherein said second spring is made of elastomeric material.

5. A pneumatic spring assembly as in claim 1 wherein said control element comprises a spring plate which supports said second spring.

6. A pneumatic spring assembly as in claim 5 wherein said elastic stop is located axially between the spring plate and the roll tube.

7. A pneumatic spring assembly as in claim 1 wherein said control valve is fixed with respect to said roll tube.

8. A pneumatic spring assembly as in claim 1 wherein said pneumatic spring has a maximum stroke length, said control element having a working length which is shorter than the maximum stroke length.

9. A pneumatic spring assembly comprising an outer tube, a roll tube which is movable through a stroke relative to said outer tube, a rolling bellows arranged between said outer tube and said roll tube and defining therewith a pressurized spring space, a control valve fixed with respect to one of said outer tube and said roll tube, a control element which acts on said control valve to feed, block, or discharge compressed air, said control element being supported to float with respect to said outer tube and said roll tube, a first spring which loads said control element toward one of said outer tube and said roll tube, and a second spring which loads the control element against the elastic force of the first spring, said second spring being a tension spring which acts on the roll tube.

10. A pneumatic spring assembly as in claim 9 further comprising a stop damping element installed functionally between a contact surface of the outer tube and a contact surface of the control element.

11. A pneumatic spring assembly as in claim 9 wherein the control element has an axial stop which determines an installation position of the control element.

12. A pneumatic spring assembly as in claim 11 wherein the second spring has a spring rate and a spring travel which are calculated to keep the axial stop disengaged in the final installation state of the pneumatic spring, regardless of the instantaneous stroke position.

13. A pneumatic spring assembly as in claim 9 wherein said control valve is fixed with respect to said roll tube, said first spring loading said control element toward said outer tube, said second spring loading the control element toward the roll tube.

14. A pneumatic spring assembly as in claim 9 wherein said pneumatic spring has a maximum stroke length, said control element having a working length which is shorter than the maximum stroke length.

* * * * *